SEMI-PERMANENT MEMORY

Filed Dec. 30, 1963 5 Sheets-Sheet 1

INVENTOR.
GEORGE G. PICK
BY Spencer E. Olson
ATTORNEY.

SEMI-PERMANENT MEMORY

Filed Dec. 30, 1963 5 Sheets-Sheet 2

INVENTOR.
GEORGE G. PICK
BY
ATTORNEY.

INVENTOR.
GEORGE G. PICK

BY

Spencer E. Olson
ATTORNEY.

INVENTOR.
GEORGE G. PICK

BY [signature]

ATTORNEY

SEMI-PERMANENT MEMORY

Filed Dec. 30, 1963 5 Sheets-Sheet 5

INVENTOR.
GEORGE G. PICK

BY Spencer E. Olson

ATTORNEY.

3,299,412

SEMI-PERMANENT MEMORY

George G. Pick, Lexington, Mass., assignor to Sylvania Electric Products Inc., a corporation of Delaware Filed Dec. 30, 1963, Ser. No. 334,413
7 Claims. (Cl. 340—173)

This invention is concerned with electronic data processing apparatus and more particularly with semi-permanent memory units useful in electronic data processing systems.

There is a particular need in the electronic data processing art for a fast, reliable, economical, and changeable semi-permanent storage means which can readily provide data information, such as is contained in operations programs, test routines, etc. and is used over and over again by the system itself. A semi-permanent memory is here by definition one whose data is mechanically set so that it cannot be changed by the machine addressing it. Early memories of this type feature rotating magnetic drums which due to their serial nature are extremely limited in speed and inadequate for the high speed requirements of random access systems. Faster memories have subsequently been developed, but they also have certain disadvantages. A particular example is the flying spot store which stores words in the form of a pattern of transparent and opaque spots on developed photographic emulsion, with reading accomplished by means of a plurality of light spots generated by a cathode ray tube. This storage means is quite expensive, requires photographic processing and is sensitive to shock, vibration and other environmental factors.

A further example is the permanent-magnet twistor memory which stores information in the form of small bar magnets, bonded to plastic cards and quite readily removable for introducing information change. Alough this system has this advantage, precision components are required which are very expensive and difficult to manufacture and the output signal levels are very low.

Another storage means is a random-access store with memory elements consisting of matrices of printed capacitors. It is very economical and compact in size but requires complicated access and read-out circuitry. In addition, it is often difficult to distinguish a ONE from a ZERO and additional capacitors are needed to alleviate this problem, thus increasing its size.

Co-pending U.S. patent applications S.N. 163,451, filed January 2, 1962, entitled "Electronic Data Processing," and S.N. 302,632, filed August 16, 1963, entitled "Electronic Memory," now abandoned, which are also assigned to the assignee of this application, describe a memory which overcomes the disadvantages of the described prior art systems. It features a plurality of data planes stacked one upon the other and a plurality of elongated solenoids passing through them. Pick-up coils on the planes surround the solenoids, each representing a bit of one of the stored words. A coil which forms a bypass conductive path around its solenoid represents a stored ZERO and one which forms an encircling path represents a stored ONE. Each plane has the facility for storing a plurality of words and has a separate solenoid for addressing it. The winding of the addressing solenoid is selectively driven to read a word on its associated plane and also acts as the primary of a transformer to allow current to flow only on its plane to cause the word stored on this plane to be read out. Briefly, the operation is as follows: Each bit coil on the plane acts as a transformer primary and its solenoid winding as a transformer secondary. A ONE bit causes a large positive signal to be induced in its solenoid winding and a ZERO bit causes a comparatively small negative signal to be induced. These signals, quite different from each other, are detected and their bit representations stored in a word register. This memory has the disadvantage, however, that each plane requires a solenoid for addressing it, and if a large number of data planes are needed in a particular application the space required for addressing solenoids could easily become larger than that used for storage.

Accordingly, a general object of this invention is to provide a semi-permanent memory unit of comparatively small size.

Another object of the invention is to provide a semi-permanent memory of the general type described in the aforesaid co-pending application having a multitude of stacked data planes and a relatively much smaller number of addressing solenoids.

More specifically, it is an object of the invention to provide a semi-permanent memory unit wherein as the number of addressing solenoids is arithmetically increased the number of planes that can be addressed increases geometrically, and almost exponentially.

Another object of the invention is to provide a semi-permanent memory whose data planes are easily dismantled for information change.

These and related objects are accomplished in one embodiments of the invention by a memory system which features a semi-permanent memory unit, an address register, a driving unit, a detection unit, and a word register. The memory unit comprises a plurality of planes, stacked one upon the other, each storing its own coded address and its data word, and a plurality of elongated solenoids, each passing through all of the planes. The address of each plane is stored on the plane by selectively arranging a plurality of etched coils which either encircle or bypass a like plurality of address solenoids in accordance with an address code. The address solenoids are energized in pairs to minimize the effects of stray magnetic flux, this pairing of the solenoids together with the address code allowing the stacking of a multitude of data planes with only a modest number of addressing solenoids. Instead of the one address solenoid per plane arrangement described in the aforementioned application, in the present system the number of data planes may be increased geometrically while increasing the number of address solenoids only arithmetically. The storage portion of each plane has thereon a plurality of similar etched coils, as in the earlier device, each arranged to surround a different storage solenoid so as to represent a bit of the stored word. A bypass path around a storage solenoid represents a stored ZERO and an encircling path a ONE. All coils, address as well as data, on a plane are arranged in a series path with a diode connected in series with the path.

When a word is to be read out of memory unit, its binary address is brought out of the address register and into a driving unit arranged to selectively drive the address solenoids in accordance with the address content. Several redundant bits are added to the incoming binary address to allow a non-critical correlation. The windings of these solenoids act as transformer primaries and each of their surrounding conductive coils as secondaries. The address code is so arranged that only the plane storing the correct address will produce a summation of positive signals in its address section, with respect to the diode conduction polarity, with all others producing a null or negative signal. Accordingly, the correct plane, and only the correct plane, forward biases its diode and allows current to flow in the data storage portion of that plane. The storage coils on the selected plane act as transformer primaries and their solenoid windings as secondaries. A coil which by-passes a solenoid induces a slightly negative signal in its solenoid winding and an encircling coil induces a comparatively large positive signal. These signals are sensed in the detection unit which readily distinguishes signals representing a ONE from those representing a ZERO, and stores the correct word in the word register.

Other objects, features, and advantages of the invention will become apparent, and its construction and operation better understood, from the following detailed description, read in conjunction with the accompanying drawings wherein.

Figure 3:
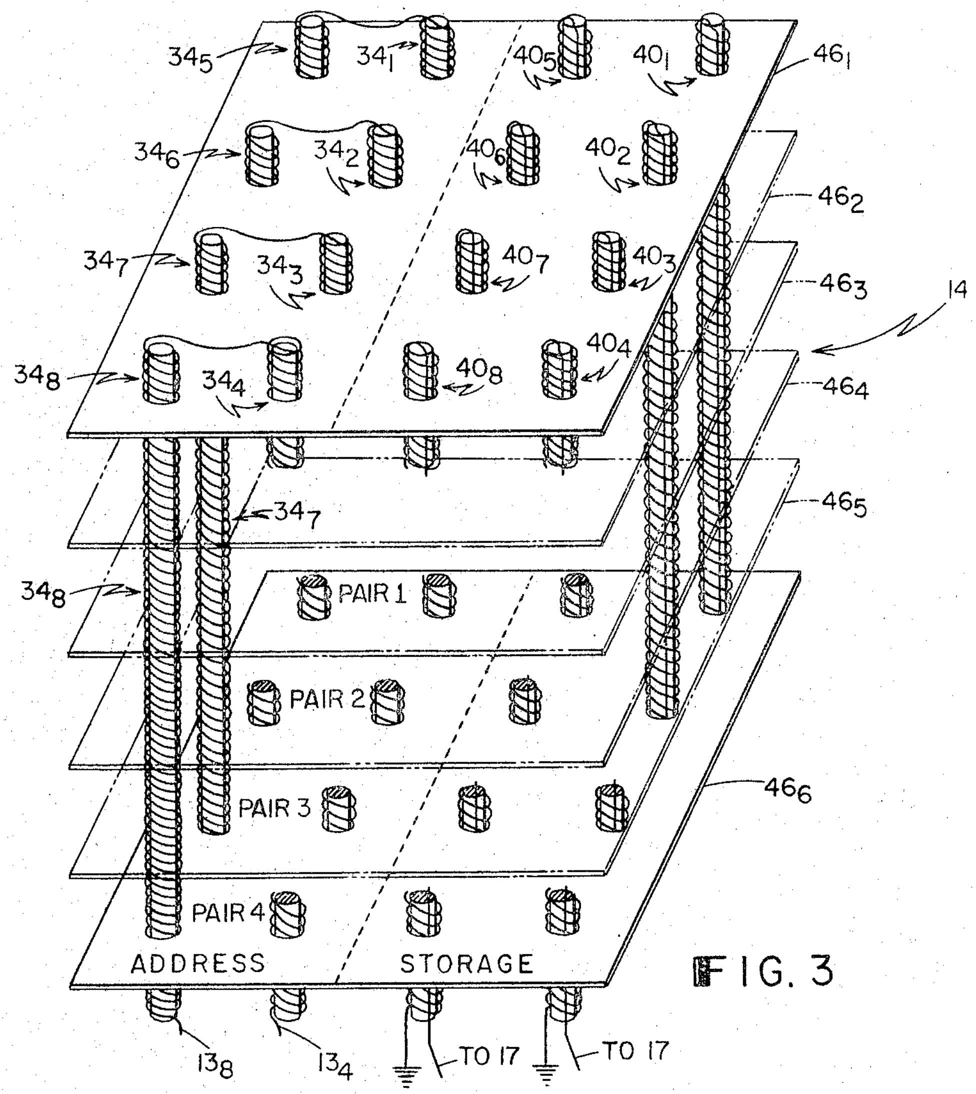
FIG. 3 is a diagrammatic representation of the memory unit of the system of FIG. 1.
Figure 5:
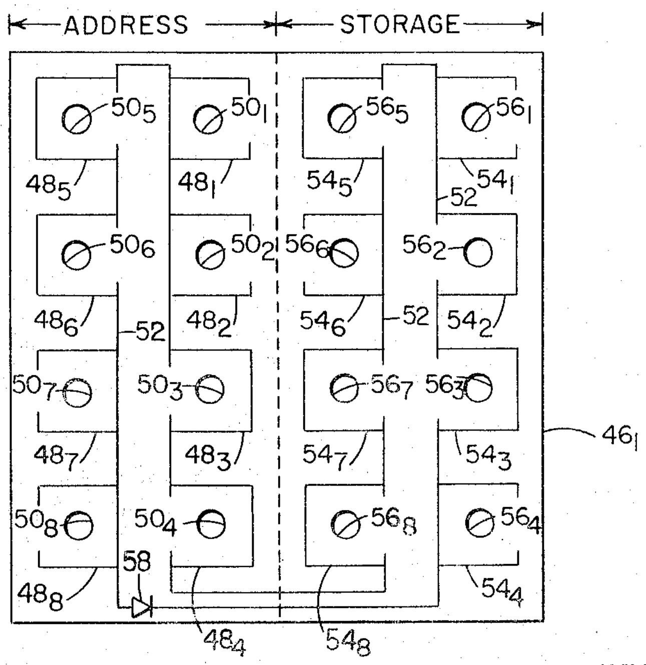
Figure 6:
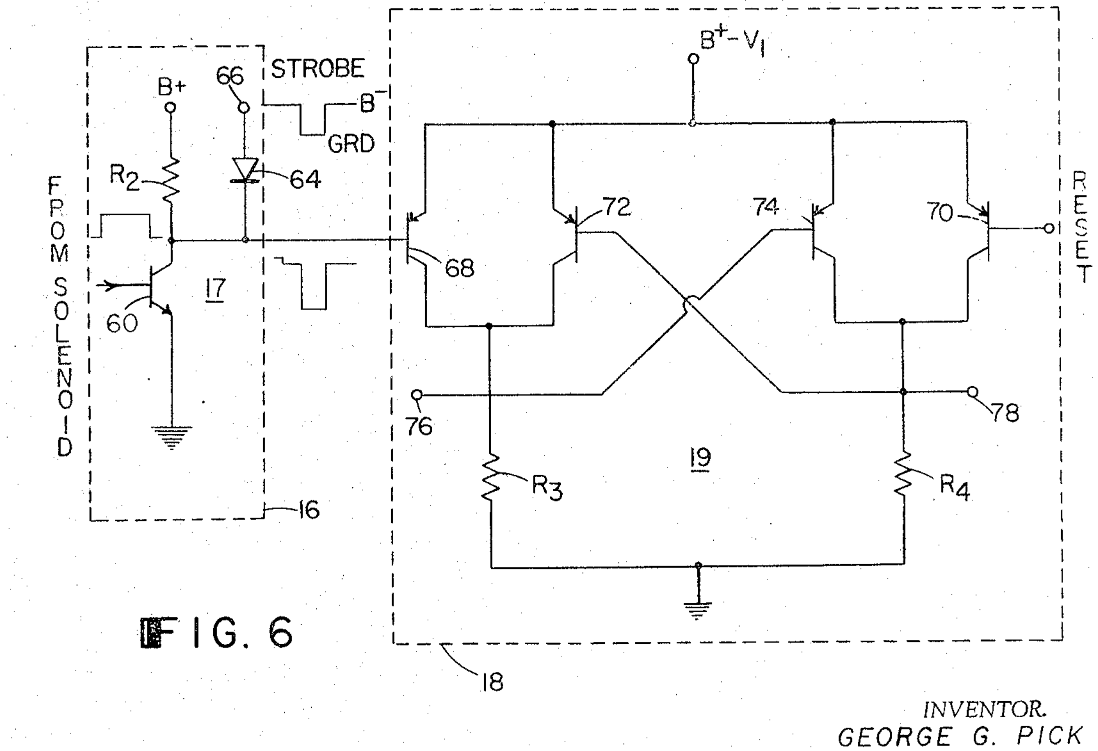

FIGS. *4a*—*4f* are diagrammatic representations of a portion of six data planes illustrating how a plurality of different addresses are stored in the memory unit of FIG. 3;

FIG. 5 is a diagrammatic representation of a representative plane in the memory unit; and, FIG. 6 is a schematic diagram of a simplified circuit for detecting and storing a bit of the word being read.

Figure 1:
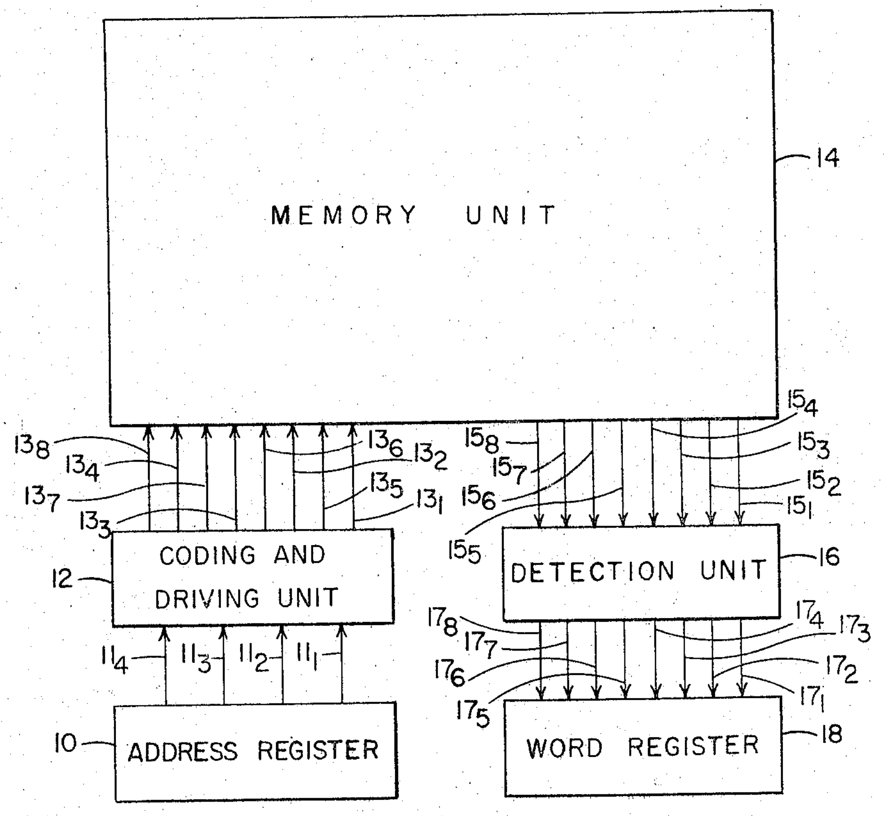
FIG. 1 is a simplified block diagram of a memory system embodying the invention.

A block diagram of the various units of the memory system is shown in FIG. 1 and comprises an address register 10, a coding and driving unit 12, a memory unit 14, a detection unit 16, and a word register 18. In the interest of simplifying the description of the invention, a system capable of addressing only six planes of the memory unit will be considered, it being understood that the principles of the invention can be extended to address a much larger number of planes, using proportionately less solenoids per plane, as will be fully explained hereinafter. In the present illustrative case, then, address register 10 stores four bits of information which uniquely describe the address of the desired word in memory unit 14. This information is transferred from register 10 to coding and driving unit 12 which interprets it and drives the correct address solenoids in memory unit 14. Each address bit corresponds to one pair of address solenoids in memory unit 14. If it is a ONE, one of the solenoids of the pair is driven, but if it is a ZERO, the other is driven. The solenoid windings of each pair are connected in series but wound in opposite directions, with the consequence that both solenoids of the pair are driven but in opposite directions.

Memory unit 14 comprises a plurality of stacked planes, each storing its own address and a data word, and a plurality of elongated solenoids, each passing through all of the planes in the stack. A plurality of etched coils are supported on each plane and selectively arranged to surround a different solenoid. The address portion of the planes, in the example here considered, consists of four pairs of coils, each pair being arranged to store one bit of the address word. If the bit is a ONE, one coil of the pair is arranged to form an encircling conductive path around its solenoid and the other by-passes its solenoid. Similarly, if the bit is a ZERO, the first coil of the pair by-passes its solenoid and the other encircles its solenoid. Thus, the first solenoid of each pair may be designated as the ONE solenoid since it is encircled only when the bit is a ONE and the other solenoid of each pair may be designated as the ZERO solenoid since it is encircled when the bit is a ZERO. All coils on each plane are connected in series to form a conductive path, each path including a single diode integrally supported on its respective plane and connected in series with the address and storage coils.

In this illustrative system, the driver unit 12 drives four address solenoids to search for the plane in which the address corresponding to the input from the address register is stored. The windings of the address solenoids, to which driving current pulses are applied, act as transformer primaries and the coils on the various planes which surround the solenoids act as transformer secondaries. A coil encircling a driven solenoid generates a negative signal and one which by-passes a driven solenoid generates no signal. Similarly, a conductive coil which encircles the other solenoid in the pair generates a positive signal and one which bypasses it produces no signal. The address code is so chosen that only the plane storing the address corresponding to the binary driving signals will produce a total address signal which is positive and a null or negative signal is produced in all other planes. Consequently, only the correct plane forward biases the diode in its series conductive path so that current may flow into the storage portion of the conductive path. The data storage coils on the plane then act as transformer primaries and the windings of the solenoids associated therewith act as secondaries. Similarly to the adress portion of the plane, a bypassing coil induces a slightly negative signal in its solenoid winding, and an encircling coil induces a comparatively large positive signal. The signals induced in the solenoids are sensed in detection unit 16 which readily distinguishes a signal representing a ONE from one representing a ZERO, and stores the word that they represent in a word register 18.

A more detailed description of each unit of the preferred system embodiment will now be given.

*Address register*

Address register 10 may comprise a plurality of flip-flop stages (not shown) which store, in binary notation, the address in memory unit 14 of the word to be read out. The binary data representation of the address is transferred in parallel to driving unit 12 in which additional bits are added to form a unique combination of digits so that only one plane in memory unit 14 will have its diode forward-biased to cause current to flow in its storage portion. As has been mentioned earlier, in this illustrative system eight address solenoids (four pairs) are driven in pairs, which may be accomplished with a four-bit word.

*Driving unit*

Figure 2:
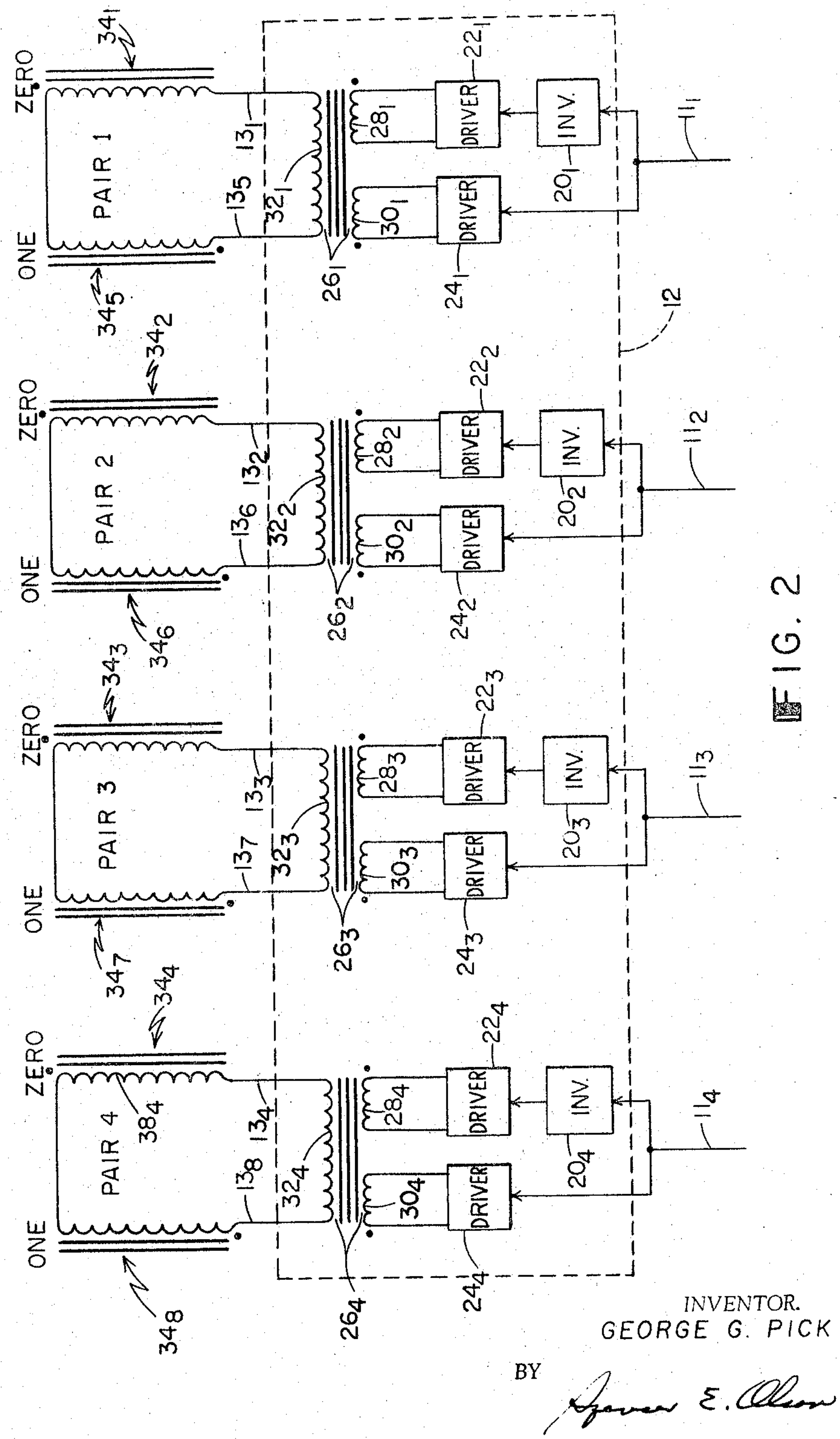
FIG. 2 is a diagrammatic representation of the driving unit of the system of FIG. 1.

The driving unit 12 for a system having four pairs of address solenoids is shown in FIG. 2 and comprises four inverters $\mathbf{20}_1$–$\mathbf{20}_4$, a pair of drivers 22 and 24 associated with each inverter, and four transformers $\mathbf{26}_1$–$\mathbf{26}_4$. One bit of the four-bit address appears on each of lines $\mathbf{11}_1$–$\mathbf{11}_4$ and are applied directly to one of its corresponding drivers ($\mathbf{24}_1$–$\mathbf{24}_4$) and after inversion to the corresponding other driver ($\mathbf{22}_1$–$\mathbf{24}_4$). Drivers 22 and 24 may take a variety of forms, a transistor switch being suitable. If a ONE, in the form of a positive pulse, is received on say line $\mathbf{11}_1$, its associated driver $\mathbf{24}_1$ produces a voltage signal in winding $\mathbf{30}_1$ of the associated transformer $\mathbf{26}_1$. Similarly, if a ZERO, or negative pulse, is received on line $\mathbf{11}_1$, driver $\mathbf{24}_1$ is not activated, but after inversion the pulse energizes driver $\mathbf{22}_1$ to produce a signal in winding $\mathbf{28}_1$ of transformer $\mathbf{26}_1$. Windings $\mathbf{28}_1$ and $\mathbf{30}_1$ are both primary windings of transformer $\mathbf{26}_1$ and having the polarities indicated, induce voltages of opposite polarities in the secondary $\mathbf{32}_1$ of the transformer. Voltage of one polarity causes current to flow in one direction through the series-connected address solenoids $\mathbf{34}_1$ and $\mathbf{34}_5$, and in the other direction if the voltage is of opposite polarity. For example, if driver 22 is turned ON by a ZERO bit on line $\mathbf{11}_1$, current flows up through the winding of solenoid $\mathbf{34}_5$, designated the ONE solenoid, and down through wind ing $\mathbf{38}_1$ of solenoid $\mathbf{34}_1$, designated the ZERO solenoid of the pair. Conversely, if the bit applied to line $\mathbf{11}_1$ is a ONE, current flows up through the winding of the ZERO solenoid and down through the winding of the ONE solenoid. The significance of this ability to select the direction of current flow in the paired solenoids will become more evident from the following description of the memory unit. The four sub-systems shown in FIG. 2 are identical and each operates in the manner just described.

*Memory unit*

Referring now to FIG. 3, memory unit 14 in this illustrative system comprises six data planes, $\mathbf{46_1}$–$\mathbf{46_6}$, stacked one upon the other, and a plurality of solenoids disposed normal to the planes and each passing through all of them. In the present illustrative system using four pairs of addressing solenoids, identified by the reference numeral 34 with distinguishing subscripts from 1 to 8, it is possible to address six planes; two of the planes are shown in full at $\mathbf{46_1}$ and $\mathbf{46_6}$, it being understood that four additional planes, shown in phantom, are stacked therebetween in the complete memory system. Each of the planes are in the form of a conductive path supported on a thin sheet of dielectric material, such as polyester film and are compactly stacked one upon the other. The coils and conductive paths on the planes, alluded to earlier, have been omitted in FIG. 3 for the sake of clarity. The solenoids consist of a coil of wire wound on a core of suitable material and are of a length sufficient to extend through the stack of planes. Because of the illustrated separation of the planes in FIG. 3, the solenoids are shown longer than required for six planes, but in systems using a different addressing code capable of addressing a large number of planes (4096 in a system to be described hereinafter), solenoids longer than those shown would be required to extend through all of the planes.

The memory unit may be considered as consisting of two distinct parts, one section for storage of data and the other for addressing the stored information. The address portion, in the present example, comprises four pairs of solenoids $\mathbf{34_1}$–$\mathbf{34_8}$, the windings of pairs of which are connected in series, and each pair representing one bit of the address code, which may be either a ZERO or a ONE depending on the direction of current flow. Using the symbolism established earlier, solenoids $\mathbf{34_1}$–$\mathbf{34_4}$ are the ZERO solenoids for the pairs, and the solenoids $\mathbf{34_5}$–$\mathbf{34_8}$ are the ONE solenoids. In the interest of clarity, only solenoids $\mathbf{34_7}$ and $\mathbf{34_8}$ are shown in their entirety, it being understood that those shown in fragmented manner also extend through all of the planes. Each of the planes has a different conductive pattern thereon (not shown in FIG. 3) for storing a unique address, the nature of which will be described in connection with FIG. 4.

The data storage portion of the memory unit comprises another group of eight solenoids $\mathbf{40_1}$–$\mathbf{40_8}$ of the same general type arranged parallel to the address solenoids and also extending through openings in the stacked planes $\mathbf{46_1}$–$\mathbf{46_6}$. Each of the planes, in the data storage portion, also has a unique conductive pattern thereon arranged to encircle or by-pass selected ones of the solenoids $\mathbf{40_1}$–$\mathbf{40_8}$ so as to permanently store information which may be addressed by the address portion of the same plane Returning now to the address portion of the planes, each of the six planes $\mathbf{46_1}$ to $\mathbf{46_6}$ has a different conductive pattern thereon as shown in FIGS. 4*a* through 4*f* so as to store a unique address. Following the symbolism adopted earlier, to store a ONE address on a plane, a conductive windings, such as an etched circuit trace on the plane, is arranged to encircle the ONE solenoid of the corresponding pair, and to store a ZERO bit the conductive pattern is arranged to encircle the ZERO solenoid of the corresponding pair. In both instances, the other solenoid of the pair is bypassed by the conductive winding. Each of the planes has eight holes $\mathbf{50_1}$–$\mathbf{50_8}$ therein, centrally located within respective "loops" of the conductive pattern and arranged to receive a corresponding address solenoid 34. The holes are of slightly larger diameter than the solenoids whereby the planes are readily assembled onto the solenoids and are, but need not be, out of mechanical contact therewith, since all coupling is inductive.

Figure 4A:
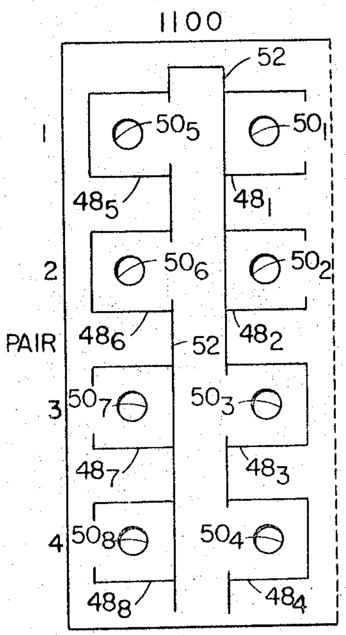

FIG. 4*a* illustrates the conductive pattern on plane $\mathbf{46_1}$ by which the address 1100 is stored. The most significant bit of this address being a ONE, the ONE coil $\mathbf{48_5}$ of pair 1 is arranged to encircle hole $\mathbf{50_5}$ through which the ONE solenoid $\mathbf{34_5}$ extends, and the ZERO coil $\mathbf{48_1}$ is arranged to bypass hole $\mathbf{50_1}$ through which the ZERO solenoid $\mathbf{34_1}$ extends. The next bit also being a ONE, the ONE coil $\mathbf{48_6}$ encircles hole $\mathbf{50_6}$, through which the ONE solenoid $\mathbf{34_6}$ extends, and the ZERO coil $\mathbf{48_2}$ bypasses hole $\mathbf{50_2}$ through which the ZERO solenoid $\mathbf{34_2}$ extends. The third bit, a ZERO, is stored by having the ONE coil $\mathbf{48_7}$ bypass hole $\mathbf{50_7}$ which contains the ONE solenoid $\mathbf{34_7}$, and by arranging ZERO coil $\mathbf{43_3}$ to encircle hole $\mathbf{50_3}$ through which the ZERO solenoid $\mathbf{34_3}$ extends. The least significant bit, also a ZERO, is stored by having coil $\mathbf{48_8}$ bypass hole $\mathbf{50_8}$ which contains the ONE solenoid $\mathbf{34_8}$, and having coil $\mathbf{48_4}$ encircle hole $\mathbf{50_4}$ through which the ZERO solenoid $\mathbf{34_4}$ passes.

Figure 4B:
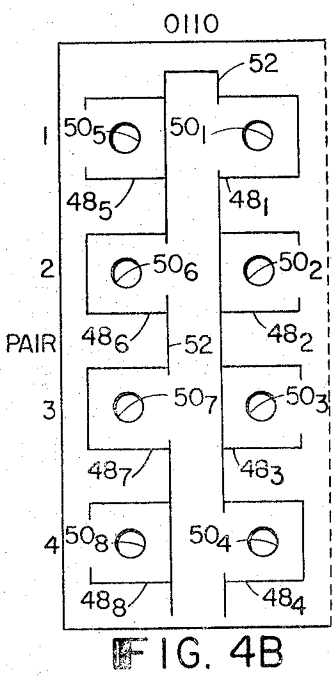

FIG. 4*b* illustrates the conductive pattern on plane $\mathbf{46_2}$ for storing the address 0110. The first ZERO is stored by the first pair of solenoids and associated coils by having winding $\mathbf{48_5}$ bypass hole $\mathbf{50_5}$ and winding $\mathbf{48_1}$ encircle hole $\mathbf{50_1}$. The first ONE is stored by having coil $\mathbf{48_6}$ encircle hole $\mathbf{50_6}$ and winding $\mathbf{48_2}$ bypass $\mathbf{50_2}$. The third bit being a ONE, winding $\mathbf{48_7}$ encircles hole $\mathbf{50_7}$ and winding $\mathbf{48_3}$ bypasses hole $\mathbf{50_3}$. The least significant bit, a ZERO, is stored by having winding $\mathbf{48_8}$ bypass hole $\mathbf{50_8}$ and by having winding $\mathbf{48_4}$ encircle hole $\mathbf{50_4}$.

Figure 4C:
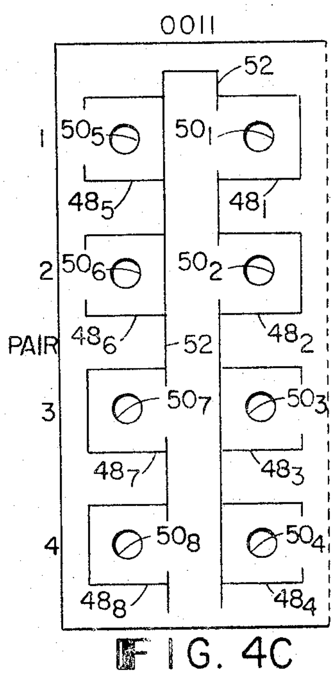

Plane $\mathbf{46_3}$ stores address 0011, as shown in FIG. 4*c*. Here, winding $\mathbf{48_1}$ encircles hole $\mathbf{50_1}$, winding $\mathbf{48_2}$ encircles hole $\mathbf{50_2}$, winding $\mathbf{48_7}$ encircles hole $\mathbf{50_7}$, and winding $\mathbf{48_8}$ encircles hole $\mathbf{50_8}$. Winding $\mathbf{48_5}$ bypasses hole $\mathbf{50_5}$, winding $\mathbf{48_6}$ bypasses hole $\mathbf{50_6}$, winding $\mathbf{48_3}$ bypasses hole $\mathbf{50_3}$, and winding $\mathbf{48_4}$ bypasses hole $\mathbf{50_4}$.

Figure 4D:
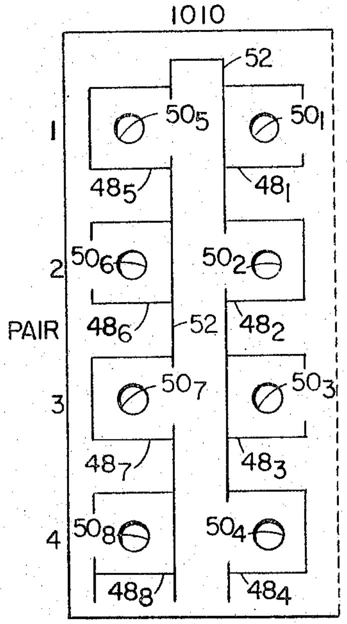

Plane $\mathbf{46_4}$ stores address 1010, as shown in FIG. 4*d*. To accomplish this, winding $\mathbf{48_5}$ encircles hole $\mathbf{50_5}$, winding $\mathbf{48_2}$ encircles hole $\mathbf{50_2}$, winding $\mathbf{48_7}$ encircles hole $\mathbf{50_7}$, and winding $\mathbf{48_4}$ encircles hole $\mathbf{50_4}$. Winding $\mathbf{48_1}$ bypasses hole $\mathbf{50_1}$, winding $\mathbf{48_6}$ bypasses hole $\mathbf{50_6}$, winding $\mathbf{48_3}$ bypasses hole $\mathbf{50_3}$, and winding $\mathbf{48_8}$ bypasses hole $\mathbf{50_8}$.

Figure 4E:
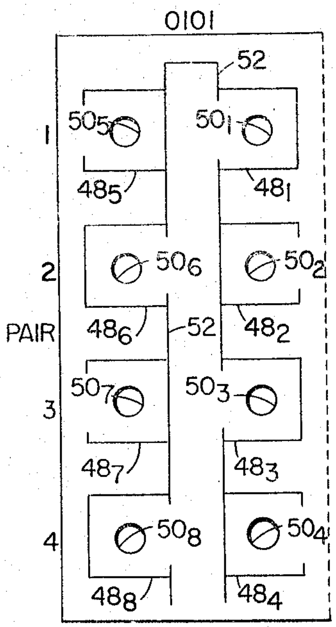

Address 0101 is stored on plane $\mathbf{46_5}$, as shown in FIG. 4*e*. Thus, winding $\mathbf{48_1}$ encircles hole $\mathbf{50_1}$, winding $\mathbf{48_6}$ encircles hole $\mathbf{50_6}$, winding $\mathbf{48_3}$ encircles hole $\mathbf{50_3}$, and winding $\mathbf{48_8}$ encircles hole $\mathbf{50_8}$. Winding $\mathbf{48_5}$ bypasses hole $\mathbf{50_5}$, winding $\mathbf{48_2}$ bypasses hole $\mathbf{50_2}$, winding $\mathbf{48_7}$ bypasses hole $\mathbf{50_7}$, and winding $\mathbf{48_4}$ bypasses hole $\mathbf{50_4}$.

Figure 4F:
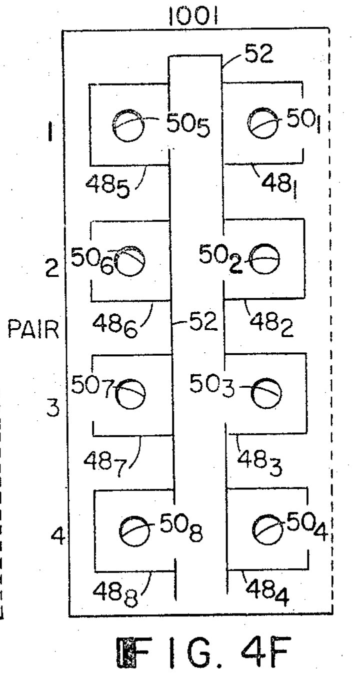

FIG. 4*f* shows the manner in which address 1001 is stored on plane $\mathbf{46_6}$. Winding $\mathbf{48_5}$ encircles hole $\mathbf{50_5}$, winding $\mathbf{48_2}$ encorcles hole $\mathbf{50_2}$, winding $\mathbf{48_3}$ encircles $\mathbf{50_3}$, and winding $\mathbf{48_8}$ encircles hole $\mathbf{50_8}$. Winding $\mathbf{48_1}$ bypasses hole $\mathbf{50_1}$, winding $\mathbf{48_6}$ bypasses hole $\mathbf{50_6}$, winding $\mathbf{48_7}$ bypasses hole $\mathbf{50_7}$, and winding $\mathbf{48_4}$ bypasses hole $\mathbf{50_4}$.

One complete representative memory plane $\mathbf{46_1}$, including both the address and the data storage portions, is shown in FIG. 5. The storage portion, adapted to store an eight-bit word, has eight holes $\mathbf{56_1}$–$\mathbf{56_8}$ therein for receiving corresponding solenoids $\mathbf{40_1}$–$\mathbf{40_8}$ (FIG. 3), and has a conductive pattern thereon including eight series-connected "loops" which either encircle or bypass a respective solenoid. For reasons which will be apparent, the paired arrangement of solenoids is not needed (although it could be used) in the storage portion of the plane; rather, if a coil 54 encircles its solenoid a stored ONE is represented, whereas a coil 54 which bypasses its solenoid represents a zero. Thus, the word 01101011 is shown as being stored in plane $\mathbf{46_1}$ since coil $\mathbf{54_1}$ stores the most significant bit, a ZERO, and $\mathbf{54_8}$ the least significant bit, in this case a ONE.

As shown in FIG. 5, all the address coils 48 and data storage coils 54 on the data plane are connected in series to form a closed conductive path 52. Diode 58 is inserted in series with this path which includes the address portion and the storage portion, the purpose of which will be explained hereinafter.

Returning now to FIG. 3, the address solenoids 34 preferably have a core of ferromagnetic material, and are designed to provide a substantially uniform magnetic field along their entire length. Ferromagnetic cores are preferred in order to achieve output voltage in the conductive patterns on the address portion of the planes of sufficient amplitude to turn on the diode and drive the data storage portion of the plane. The address solenoids 34 are arranged in four pairs, and in each pair the ONE solenoid winding and the ZERO solenoid winding are connected in series. Considering pair 1, for example, solenoid $\mathbf{34}_8$ is wound from the bottom to the top where the winding is carried across to solenoid $\mathbf{34}_4$ and wound from the top to the bottom and brought out at $\mathbf{13}_4$. Pairing of the address solenoids in this manner provides relative uniformity in the amplitude of the signals induced in the conductive patterns on the data planes, even with slight differences in electrical properties between solenoids, and greatly minimizes interaction between solenoids which might otherwise cause output signals to be inducted in coils on the data plane which were not actually being driven. And very importantly, pairing of the solenoids effectively "doubles" the coding distance of the device; i.e., by virtue of the pairing, +1 voltage unit is induced for a yes, or ONE, and −1 voltage unit is induced for a no, or ZERO, whereas with a single driving solenoid the induced signal would be either +1 or 0 for yes and no, respectively.

The storage solenoids 40 may have either an air core or a core of ferromagnetic material, but because of the relative ease of fabricating air-core solenoids, and since relatively uniform output signals of suitable amplitude are induced in an air-core solenoid by the current in a driven data storage plane, the air-core is preferred. However, if larger outputs are desired, ferrite cored solenoids are preferred. As illustrated, the solenoids 40 are not paired (i.e., there is one solenoid per bit) and each is wound from the bottom to the top with the free end brought down alongside the solenoid to the bottom.

The memory unit 14 functions in the following manner: Recalling the previous explanation of driving unit 12, the ZERO solenoid of a pair of address solenoids is driven when the corresponding address bit is a ONE, and the ONE solenoid is driven when the address bit is a ZERO. When the ONE solenoid is driven, current flows up through its winding and down through the series-connected ZERO solenoid winding. Conversely, when the ZERO solenoid 34 is driven, current flows up through its winding and down through the series-connected ONE solenoid winding. Thus, current may flow in either direction through the solenoid pair, the direction depending upon the bit being searched. The conductive coils 48 on the various planes 46 which surround these solenoids act as transformer secondaries with the driven windings 38 serving as transformer primaries. Depending on the direction in which solenoid current is caused to flow when searching for a bit, the pair for that bit position on every plane 46 generates either a positive or negative signal. If the bit stored is the same as that being searched for, a positive signal is generated; if it is not the same, a small negative signal is generated. This results because if the bit stored is equal to the bit searched for, current flows in a direction in the driven solenoid to produce a flux which causes a positive signal to be induced in an encircling coil 48, and in the opposite direction through the other solenoid of the pair so as to produce a flux which would cause a negative signal to be induced in an encircling coil 48; but, since in each pair, one coil encircles and the other coil bypasses its corresponding solenoid, no signal is produced in the other coil. Now consider the case where the bit stored is not the bit being searched. Current again flows in a direction through the solenoid 34 representing the address bit to produce a flux which would cause a positive signal to be induced in an encircling coil 48, but since the coil bypasses the solenoid no signal is produced in it. Current flows in the opposite direction through the other solenoid of the pair so that its flux is in the opposite direction and a negative signal is induced in the encircling coil 48.

The significance of the foregoing will be more evident by again considering the address portion of the planes $\mathbf{46}_1$–$\mathbf{46}_6$ in FIGS. *4a–4f*. Since all of the address coils on any plane are connected in series, the signals induced in the coils of the pairs will add algebraically. Accordingly, when an address is being searched for, the conductive path on the plane in which that address is stored will have four units of positive voltage induced therein, which may be represented as +4, whereas all of the other planes produce either zero or −4 units of voltage. For example, in the case of plane $\mathbf{46}_1$, when its stored address of 1100 is to be read, driving unit 12 drives solenoids $\mathbf{34}_5$, $\mathbf{34}_6$, $\mathbf{34}_3$ and $\mathbf{34}_4$. It will be noted in FIG. *4a* that on this plane these solenoids are encircled by coils $\mathbf{48}_5$, $\mathbf{48}_6$, $\mathbf{48}_3$ and $\mathbf{48}_4$, respectively, whereby each pair contributes a +1 unit of voltage, the sum of which is +4, indicative of the correct plane.

Since the address 1100 is not stored in plane $\mathbf{46}_2$, the driving of solenoids $\mathbf{34}_5$, $\mathbf{34}_6$, $\mathbf{34}_3$ and $\mathbf{34}_4$ does not produce a positive output. Since solenoid $\mathbf{34}_5$ is by-passed by coil $\mathbf{48}_5$, the first pair produce −1 unit, and similarly, the other pairs contribute +1, −1 and +1, respectively. The sum of these is zero, showing that the searched-for address is not stored on plane $\mathbf{46}_2$.

A smilar analysis of planes $\mathbf{46}_3$ through $\mathbf{46}_6$ will show that with the solenoids driven as indicated in search of the address 1100 plane $\mathbf{46}_3$ will produce a −4 signal, plane $\mathbf{46}_4$ a zero, plane $\mathbf{46}_5$ a zero, and plane $\mathbf{46}_6$ a zero, all indicative that they do not store the interrogating address. By reason of the address code, only the plane on which the interrogating address is stored produces the +4 signal, this being true for each of the six addresses shown in FIGS. *4a* through *4f*.

It having been shown how the solenoids and conductive pattern on the plane storing the interrogating address cooperate to produce a +4 signal, while all other planes produce a zero or negative signal, reference is again made to the complete plane $\mathbf{46}_1$ of FIG. 5 for a description of how this effect is utilized to read out the word stored in the storage portion of the plane. By virtue of the +4 voltage signal in the closed conductive path 52, the diode 58 in the path is forward biased, allowing current to flow through the conductive pattern on the storage portion of the plane. Since the diodes 58 in all planes other than the one having the interrogating address stored thereon are backbiased, no current flows in these planes. It has been noted earlier that this pattern is arranged to store the word 01101011. Each of the coils in the storage portion functions as the primary of a transformer, the current therethrough inducing a voltage in its respective solenoid, which acts as the secondary of a transformer. Those coils 54 which are arranged to bypass their solenoids induce a small negative voltage in the solenoid, and those which encircle their solenoids induce comparatively large positive signals in their solenoids. The signals induced in the solenoids $\mathbf{40}_1$–$\mathbf{40}_8$ are applied to and are sensed by detection unit 16 which discriminates between them and determines which binary bit they represent.

*Detection unit and word register*

Detection unit 16 in the present illustrative system comprises eight individual detection circuits, one connected to each of the storage solenoids 40 of memory unit 14, and capable of distinguishing a ONE represented by a large positive signal and a ZERO represented by a small negative signal. One such detection circuit 17 and a stage of the word register 18 is shown in FIG. 6. The detection circuit includes a transistor 60 the emitter and collector electrodes of which are respectively connected to ground and to a source positive potential through a suitable resistor $R_1$. One terminal of the winding of one of the storage solenoids 40 (FIG. 3) is connected to the base electrode of the transistor, the other terminal of which, as shown in FIG. 3, is connected to ground. The opening and closing of the switch including transistor 60 is controlled by strobe or timing pulses applied to the collector electrodes through a diode 64 from a computer (not shown) associated with the disclosed memory system, represented by terminal 66. The strobe pulses have an excursion between B+ and ground, as indicated.

The word register, with which the detection unit is intimately associated includes a flip-flop stage for each transistor switch, one of which is shown at 19 in FIG. 6. The flip-flop includes an input transistor 68 to the base electrode of which the collector of transistor 60 is connected, a second transistor 70 to which reset pulses are applied from an external source (not shown), and a pair of cross-connected transistors 72 and 74. The emitter electrodes of all four transistors are connected together and to a source of B+ potential; the collectors of transistors 68 and 72 are connected together and through a common resistor $R_3$ to ground; and the collectors of transistors 70 and 74 are connected together and through a common resistor $R_4$ to ground.

In operation, when there is coincidence of a positive voltage pulse from the associated solenoid with the strobe pulse, which is applied in common to all of the stages, transistor 60 conducts and causes a negative-going pulse to be applied to the base of transistor 68 to set the flip-flop 19 and thereby store an information bit. On the other hand, if the input voltage from the associated solenoid is zero or negative, the strobe pulse has no effect on transistor 60 and the flip-flop does not set. That is, only a positive signal, representing a ONE, from an associated solenoid will place the flip-flop in its set condition.

Word register 18 (FIG. 1) comprises eight flip-flop stages of the kind shown in FIG. 6, one for each of the storage solenoids $40_1$–$40_8$, for storing the eight bit word read from the address plane.

To briefly summarize, each of the data planes in the stack has an address portion and a word storage portion and all are addressed by driving or energizing selected ones of the group of solenoids associated with the address portion. In essence, driving of the address solenoids sets up the input for a correlation between the input and the address stored on each plane. The arrangement of the conductive paths on the respective planes is so related to the address solenoids that the voltage induced on the plane being addressed is positive and the voltages in all other planes are negative with respect to the diode polarity. A diode fabricated to each plane, and connected in series with the conductive paths of the address and storage portions of the planes, allows current to flow only in the addressed plane. Since the data in the storage portion of a plane is transferred to the pick-up solenoids associated with the storage portion only when a current flows in the storage portion of that plane, the forward-to-reverse current ratio of the diode yields a select to un-select ratio of the order of a million to one.

A simple system of four paired solenoid drives has been selected to illustrate the addressing technique, a system in which eight addressing solenoids are required to address six data planes. Except for the elimination of conductive connections between the addressing and storage portions (which is significant), it may not be apparent that the present technique is an improvement over the one address solenoid per data plane system described in the aforementioned co-pending application. As has already been mentioned, the pairing of the addressing solenoids doubles the distance between a match and the closest mismatch, and minimizes the effects of stray return fields. The stray fields resulting from one address solenoid per plane have been found so damaging that no more than about ten stacked planes can be addressed without inducing troublesome currents in the un-selected planes. Hence, a diode and/or paired addressing solenoids can advantageously be applied to systems described in the aforementioned application. It is emphasized that the simplicity of the code selected for illustration of the principle causes the apparent disadvantage of the disclosed approach. However, more than six data planes obviously would be used in any practical system, and as has been noted earlier, codes are available which allows the number of data planes to be increased geometrically while increasing the number of addressing solenoids only arithmetically. Group codes, for example of the Golay and Hamming types, have been developed and used for error correction in communications work. Both types have the characteristics of a long "distance" between a matched code and any of the other allowable codes. For instance, in a Golay code of 23 bits, only 12 are information bits with the rest parity or redundant bits; however, the 11 redundant bits contribute to the "distance" of the code. If, for example, one bit of a 12 binary bit number is changed, a wrong number results, but in a Golay code, four bits must be changed to get a wrong number. Thus the binary code has "distance" of "one," whereas the Golay code has a "distance" of "seven." By using the Golay code in the herein described system of paired addressing solenoids, it is possible with twenty-three solenoid pairs, or forty-six solenoids, to provide 4096 unique addresses with a substantial minimum voltage difference between a selected plane and the closest non-selected plane. As described earlier, by virtue of the paired solenoids the "distance" is doubled, because the voltage goes from minus to plus values instead of from zero to just plus values, and by virtue of the 23 bit code the voltages induced in the various planes may vary between −23 and +23 voltage units, a spread of 46 units. Hence, a match between the interrogating address and the address stored on a particular plane causes a voltage of +23 units to be induced in that plane, whereas a mismatch (any other word) induces a voltage between −23 units and +9 units. If then, the data plane has included on it nine additional positions for nine solenoid pairs, a bias of −9 units is always added by encircling nine of the negative unit solenoids. Thus, the mismatched planes are backed off so as to all have negative values, leaving a minimum difference of +14 voltage units between a matched and the closest mismatched palen. The availability of the +14 voltage units allows load-sharing among the solenoid drivers, whereby the amplitude of the driver voltages is relatively non-critical since the bias on individual planes can be varied somewhat to compensate for such inaccuracies. In comparison, if a 12-bit binary code is used instead of the Golay code, and one addressing solenoid per plane is employed, a signal of +12 voltage units is induced for a match and +10 voltage units are induced in the nearest mismatched plane, leaving only two voltage units available for biasing the diode and driving the plane.

For a more thorough treatment of the characteristics of the Golay code, attention is invited to a book by W. W. Peterson entitled "Error Correcting and Error Detecting Codes," Technology Press, Cambridge, Mass., 1961.

In a system which has been successfully operated and has 1024 data planes, a Hamming type code (see article by R. W. Hamming entitled "Error Correcting and Error Detecting Codes," Bell System Technical Journal, vol. 29, p. 147–160, April 1950) is used. This is a 15-bit code of ten information bits and five redundant bits, with a "distance" of four, which is doubled to eight through the use of paired addressing solenoids. Using this code, a match between the address word and the stored address causes a voltage of +15 units to be induced in that plane, whereas a mismatch induces a voltage of between −15 and +7 units. By biasing the diodes in the planes with −8 voltage units, a match gives +7 voltage units and mismatches give signals between −1 and −22 voltage units, or a minimum difference between match and nearest mismatch of +8 units. In this embodiment, the driving solenoids and conductive patterns on the planes are so designed, and a driving current used, to cause a voltage unit to equal .67 volt, or a driving voltage of +4.69 volts for a match, which easily drives the diode on the selected plane into conduction and causes sufficient current to flow in the conductive pattern on the plane to induce significant signals in the storage solenoids 40.

In this practical embodiment, the address register 10 delivers ten information bits, the five redundant bits being generated by five parity generators in the coding and driving unit 12, each of which takes the parity of a sub-set of six bits in the 10-bit address word. Alternatively, the redundant bits could be generated, less expensively, by a shift register with several feedback paths, but at a somewhat slower speed. The latter method is much more economical when longer codes, such as the Golay code, are used.

A comparison of the characteristics of three possible codes, binary, Hamming, and Golay set forth in the following table illustrate the advantages to be gained from using "long distance" codes in the present practical memory system:

| Characteristic | Binary | Hamming | Golay |
|---|---|---|---|
| No. of address bits | 10 | 10 | 12 |
| No. of data planes | 1,024 | 1,024 | 4,096 |
| No. of redundant bits | 0 | 5 | 11 |
| No. of bias bits | 9.5 | 9 | 9 |
| No. of load-sharing bits | .5 | 6 | 14 |

It will be seen that in the case of the Hamming code, the ratio of address solenoids to data planes is about 1 to 34, and with the Golay code the ratio is about 1 to 89, which represents a significant saving in equipment over the one solenoid per plane system, even if the latter did not suffer from stray magnetic fields.

Other advantages of the present system is the integral inter-connection of the address and storage sections, and associated diode, on each plane, thereby eliminating the need to make connections to the plane. Thus, the data stored can be changed at will simply by removing planes from the stack and substituting others. This is accomplished by merely lifting the planes off the solenoids; there are no external ohmic connections to the plane. Besides the convenience afforded, the elimination of contacts contributes significantly to the reliability of the system.

Although one simple code has been used for illustrative purposes, and two other practical codes described, a large variety of codes are available from communication theory work and may be used in implementing the system. In general, such codes may be described as those which generate in the plane storing the interrogating word a larger, or more positive, voltage than is generated in any of the planes which do not match. Any code is applicable, but those codes in which the difference between the signals induced for match and mismatch is maximized are most practical from the standpoint of circuit implementation. The code selected for use is derived by including in coding and driving unit 12 means for generating the parity digit of each of a sub-set of binary bits within the address number from register 10, the sub-sets being so chosen that the additional bits have the property of increasing the difference between any of the potential words represented by the initial bits versus all of the others. Also, while specific circuitry for driving the address solenoids and for detecting and storing the data read from the data planes has been shown and described, other means for accomplishing these functions will now occur to ones skilled in the art. For example, the separate transformers for driving each pair of solenoids can be eliminated by using bifilar windings on the paired addressing solenoids and driving one winding by driver 22 and the other by driver 24 to accomplish reversal of the direction of current flow in the windings of the paired solenoids. It is applicant's intention, therefore, that the invention not be limited to what has been shown and described except as such limitations appear in the appended claims.

What is claimed is:

1. A semi-permanent non-destructive memory comprising a plurality of insulative sheets stacked in parallel relationship with each other and each having data and the address of said data encoded therein by suitably configured series connected conductive paths, a first and a second plurality of elongated solenoids each passing through said sheets, said conductive paths on each sheet either surrounding or by-passing corresponding ones of said first and second plurality of solenoids to respectively represent the address of the associated sheet and the data content of the associated sheet, means for energizing selected ones of said first plurality of solenoids to thereby address said sheets, and means coupled to said second plurality of solenoids and operative to sense the data stored in a selected sheet.

2. A semi-permanent non-destructive memory comprising a plurality of insulative sheets stacked in parallel relationship with each other, and having a plurality of aligned openings therein and each having a closed conductive pattern thereon permanently storing a data word and an address unique to its sheet, the conductive pattern on each of said sheets including a diode connected in series therewith, a first and a second plurality of elongated solenoids each passing through a corresponding aligned opening in said sheets and in inductive coupling relationship with said conductive patterns, said conductive pattern on each sheet either encircling or by-passing corresponding ones of said first and second plurality of solenoids to respectively represent the address of the associated sheet and the data content of the associated sheet, means connected to and operative to energize selected ones of said first plurality of solenoids to thereby address said sheets, and means coupled to said second plurality of solenoids and operative to sense a signal representative of the data stored in a selected sheet.

3. A semi-permanent non-destructive memory comprising a plurality of data planes stacked in parallel relationship with each other and having a plurality of aligned openings therein and each having a closed conductive pattern thereon permanently storing a data word and an address unique to its plane, the conductive pattern on each of said planes including a diode connected in series therewith, a first and a second plurality of elongated solenoids each passing through corresponding aligned openings in said planes and in inductive coupling relationship with said conductive patterns, said conductive pattern on each plane either encircling or by-passing corresponding ones of said first and second plurality of solenoids to respectively represent the address of the associated planes and the data content of the associated plane, means connected to and operative to energize selected ones of said first plurality of solenoids to simultaneously search all of said planes for a selected address, the plane storing said selected address being responsive to energization of said selected ones of the first plurality of solenoids to cause conduction of the diode thereon and current to flow in its conductive pattern, and means coupled to said second plurality of solenoids and operative to sense a signal representative of the data stored in the selected plane.

4. A semi-permanent non-destructive memory comprising, a plurality of data planes stacked in parallel relationship with each other and each containing a closed conductive path including a diode in series therewith for permanently storing data and an address unique to the plane, a plurality of addressing solenoids passing through all of said planes, a plurality of data solenoids passing through all of said planes, the closed conductive path on each data plane encircling or by-passing each addressing solenoid to represent bits of the stored address and encircling or by-passing each data solenoid to represent bits of the stored data, means connected to and operative to energize selected ones of said plurality of addressing solenoids to thereby address said planes, and means coupled to said plurality of data solenoids and operative to sense a signal representative of the data stored in a selected plane.

5. A memory according to claim 3 in which said solenoid energization means includes group coding means operative to reduce the number of addressing solenoids necessary to energize a plurality of data planes.

6. A semi-permanent non-destructive memory comprising, a plurality of data planes stacked in parallel relationship with each other and each containing a closed conductive path including a diode in series therewith for permanently storing data and an address unique to the plane, a plurality of addressing solenoids passing through all of said planes, a plurality of data solenoids passing through all of said planes, the closed conductive path on each data plane encircling or by-passing each addressing solenoid to represent bits of the stored address and encircling or by-passing each data solenoid to represent bits of the stored data, addressing means for producing a group coded version of the address of a selected plane, means coupled to and operative in response to said group coded address to energize selected ones of said addressing solenoids to thereby induce a current in the closed conductive path of the selected plane, and means coupled to said data solenoids and operative to sense a signal representative of the data stored in the selected plane.

7. A semi-permanent non-destructive memory comprising, a plurality of insulative sheets each having a matrix of holes therein and stacked in parallel relationship with the holes in registration, a closed conductive pattern including a diode in series therewith formed on each sheet, each conductive pattern including a plurality of conductive paths which either encircle or by-pass respective ones of said holes to thereby represent stored bits of data and the address of said data, a first and a second plurality of elongated solenoids each passing through corresponding holes in said stacked sheets, an address register operative to produce signals representative of the address of data stored in a selected stacked sheet, driving means coupled to said first plurality of solenoids and operative in response to the signals from said address register to energize selected ones thereof to thereby induce signals in said conductive patterns, the sheet storing the selected data being responsive to energization of said selected ones of the first plurality of solenoids to cause conduction of the diode thereon and current to flow in its conductive pattern, detection means coupled to said second plurality of solenoids and operative in response to said current produced in the selected sheet to produce output signals only when said induced signals are of one polarity, and means operative in response to said output signals to indicate the data content of the selected sheet.

References Cited by the Examiner

UNITED STATES PATENTS

| | | | |
|---|---|---|---|
| 2,973,508 | 2/1961 | Chadurjian | 340—174 |
| 3,131,291 | 4/1964 | French | 340—173 X |

FOREIGN PATENTS

| | | |
|---|---|---|
| 870,108 | 6/1961 | Great Britain. |

OTHER REFERENCES

Kilburn, T. et al.: A Digital Computer Store with Very Short Read Time, Proceedings of the Institution of Electrical Engineers, volume 107, Part B, No. 36, November 1960.

BERNARD KONICK, *Primary Examiner.*

IRVING SRAGOW, *Examiner.*

H. D. VOLK, S. URYNOWICZ, *Assistant Examiners.*